US005626307A

United States Patent [19]

Smith

[11] Patent Number: 5,626,307
[45] Date of Patent: May 6, 1997

[54] MOBILE SWIMMING POOL MAINTENANCE SUPPLIES STORAGE CABINET WITH VENTILATION AND DRAINAGE AND WITH VACUUM HOSE REEL ENCLOSED UNDER SLIDABLE ROOF

[76] Inventor: Jeffrey M. Smith, 6750 Lamont Rd., Castile, N.Y. 14427

[21] Appl. No.: 246,620

[22] Filed: May 20, 1994

[51] Int. Cl.⁶ .................................................. B65H 75/40
[52] U.S. Cl. ........................... 242/403.1; 242/533.8; 242/557; 242/582; 280/47.26
[58] Field of Search .................... 242/533.8, 557, 242/403, 403.1, 407, 582, 398, 379.2, 406; 280/47.19, 47.26, 47.33; 137/355.26, 355.27, 355.23

[56] References Cited

U.S. PATENT DOCUMENTS

| | | | |
|---|---|---|---|
| 1,847,945 | 3/1932 | Hoskins et al. | 242/582 |
| 2,634,189 | 4/1953 | Hill | 280/47.19 X |
| 2,640,724 | 6/1953 | Sanders et al. | 242/403.1 X |
| 2,742,242 | 4/1956 | Godwin | 242/403.1 X |
| 2,883,731 | 4/1959 | Wells | 280/47.26 |
| 2,964,328 | 12/1960 | Muir | 280/47.19 |
| 3,977,037 | 8/1976 | Miyake et al. | 15/315 |
| 4,431,144 | 2/1984 | Foster | 242/406 |
| 4,759,560 | 7/1988 | Virgulti | 280/47.26 |
| 4,989,291 | 2/1991 | Parent | 15/315 |
| 5,013,055 | 5/1991 | Labrum | 280/47.19 |
| 5,113,546 | 5/1992 | Parent | 15/315 |
| 5,244,219 | 9/1993 | Hadlum | 280/47.26 |
| 5,273,298 | 12/1993 | Brown, Sr. | 280/47.19 |
| 5,376,035 | 12/1994 | Forrest | 242/407 X |

FOREIGN PATENT DOCUMENTS

| | | |
|---|---|---|
| 681242 | 9/1929 | France . |
| 3-295520 | 12/1991 | Japan . |

*Primary Examiner*—Daniel P. Stodola
*Assistant Examiner*—Emmanuel M. Marcelo
*Attorney, Agent, or Firm*—Nixon, Hargrave, Devans & Doyle LLP

[57] ABSTRACT

A pool equipment cart (10) in accordance with the present invention includes a cabinet (12) with a pair of end panels (14 and 16), a pair of side panels (18 and 20), and a bottom panel (22). An opening (28) located between end panels (14 and 16) which provides access to the cabinet interior. A take-up reel (30) with a sleeve (57) is rotatably seated on an axle (58) mounted between the pair of side panels (18 and 20) and is designed to accommodate only a single width of pool vacuum hose (72). Additionally, a curved roof (26) may be slidably disposed on side panels (18 and 20) to move between positions exposing and covering the opening (28). Further, a pair of wheels (38 and 40) connected by an axle (42) may be secured to bottom panel (22) and two supporting pieces (44 and 46) may be connected to bottom panel (22) to support cabinet (12) with wheels (38 and 40). Even further, one end of a rope (96) may be connected to the center of take-up reel (30) with the other end of rope (96) connected to a starter piece (94) which has two ends (100 and 102), with each end (100 and 102) designed to fit snugly into one end of a pool vacuum hose (72). Even further, the pool equipment cart (10) may include brackets (62 and 66) and a shelf (32).

17 Claims, 3 Drawing Sheets

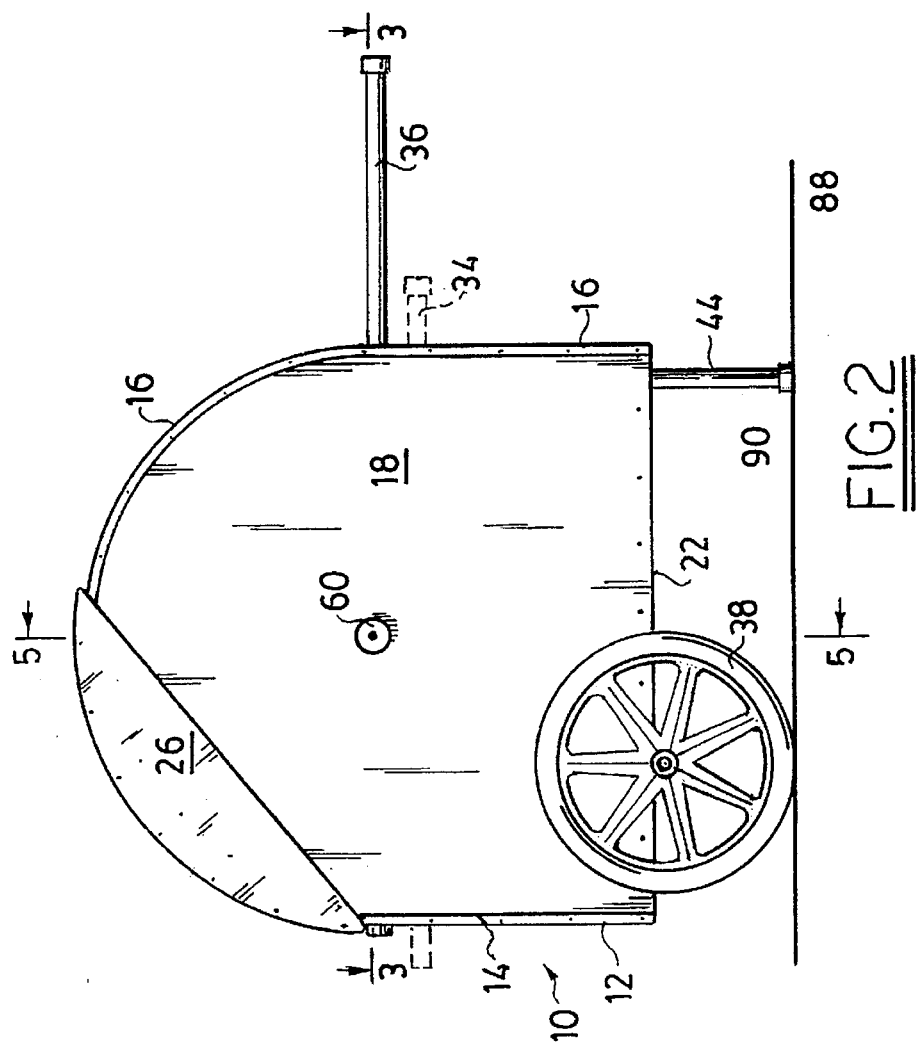
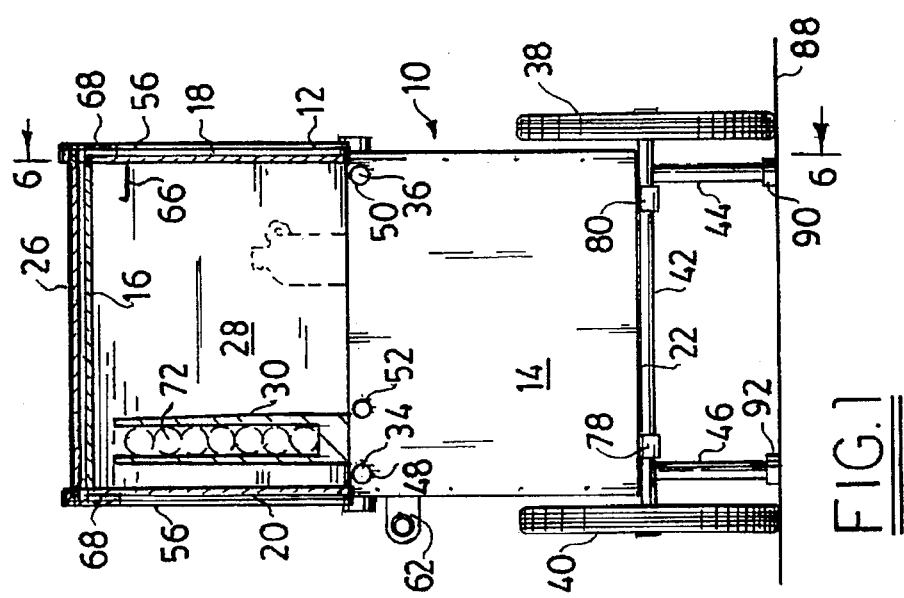

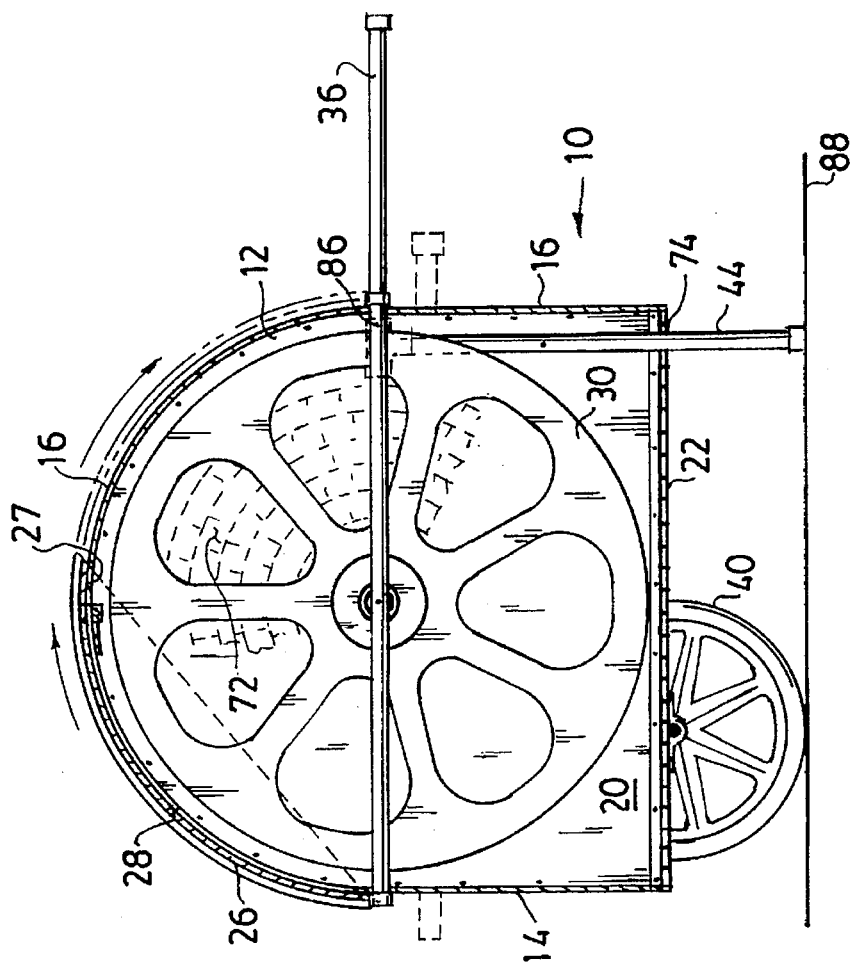
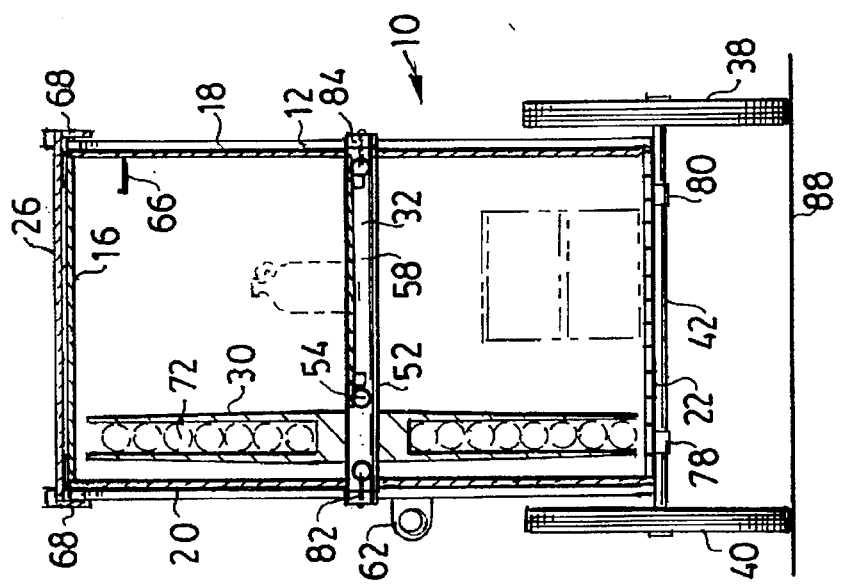

5,626,307

MOBILE SWIMMING POOL MAINTENANCE SUPPLIES STORAGE CABINET WITH VENTILATION AND DRAINAGE AND WITH VACUUM HOSE REEL ENCLOSED UNDER SLIDABLE ROOF

FIELD OF THE INVENTION

This invention relates generally to an equipment cart and more particularly to an equipment cart for carrying and storing Swimming pool equipment and chemicals for cleaning and maintaining a swimming pool.

BACKGROUND OF THE INVENTION

Swimming pools continue to enjoy great popularity in many communities providing families with a source of relaxation and enjoyment. Unfortunately, for pool owners, swimming pools require periodic maintenance to keep them clean and operational.

One of the primary reasons pool owners dislike pool maintenance is because of the problems owners have in transporting to and from the swimming pool the equipment necessary to clean and maintain the swimming pool. In particular, transporting automatic cleaners, the pool vacuum hose, the pool rod with its various connectors, including the skimmer, leaf rake and brush, and the necessary chemicals is cumbersome. Often several trips are required to bring the necessary equipment and chemicals to the swimming pool. Additionally, pool owners often do not have any place to neatly store the equipment and chemicals between uses. Further, pool owners have had a difficult time storing pool chemicals, such as muriatic acid, because the chemicals are corrosive and must be kept in well ventilated areas.

Accordingly, there is a need for an apparatus for transporting to and from a swimming pool and storing the equipment and chemicals necessary for cleaning and maintaining the swimming pool.

SUMMARY OF INVENTION

A pool equipment cart in accordance with the present invention includes a cabinet with a pair of end panels, a pair of side panels, and a bottom panel. The end, side, and bottom panels are made from materials which are weatherproof, corrosion resistant to pool chemicals, and may include one or more holes for ventilation. The cart includes an opening between the end panels and the side panels which provides access to the cabinet interior. A take-up reel is rotatably seated on an axle which is mounted between the pair of side panels and is preferably designed to accommodate only a single width of pool vacuum hose. A curved roof may be slidably disposed on the side panels to move between positions exposing and covering the opening. A pair of wheels connected by an axle may be secured to the bottom panel and at least one supporting piece may be connected to the bottom panel to support the cabinet with the wheels. The pool equipment cart may include brackets and shelves for storing pool equipment and accessories. One end of a rope may be connected to the center of the take-up reel with the other end of the rope connected to the starter piece which has two ends, with each end of the starter piece designed to fit snugly into one end of a pool vacuum hose.

The pool equipment cart has several advantages. With the pool cart, pool equipment and cleaning chemicals can be easily transported to and from the swimming pool. Additionally, the cart is made from lightweight and durable materials making it easy to maneuver, resistant to chemical corrosion and able to withstand rain, snow, and other elements. Further, with the take-up reel designed to accommodate only a single width of pool vacuum hose, the pool vacuum hose can be unraveled for use and rolled up for storage with ease and without getting tangled. Even further, the cart provides a neat storage device for housing the pool equipment maintenance and cleaning tools which can be left near the pool or in the garage and has adequate ventilation to prevent pool chemical fumes from concentrating in the cart.

BRIEF DESCRIPTION OF THE DRAWINGS

FIG. 1 is a back view of a pool equipment cart in accordance with the present invention;

FIG. 2 is a side view of the pool equipment cart shown in FIG. 1;

FIG. 5 is a cross-sectional view taken along line 5—5 of FIG. 2 of the pool equipment cart;

FIG. 6 is a cross-sectional view taken along line 6—6 of FIG. 1 of the pool equipment cart.

DETAILED DESCRIPTION

Figure 3:
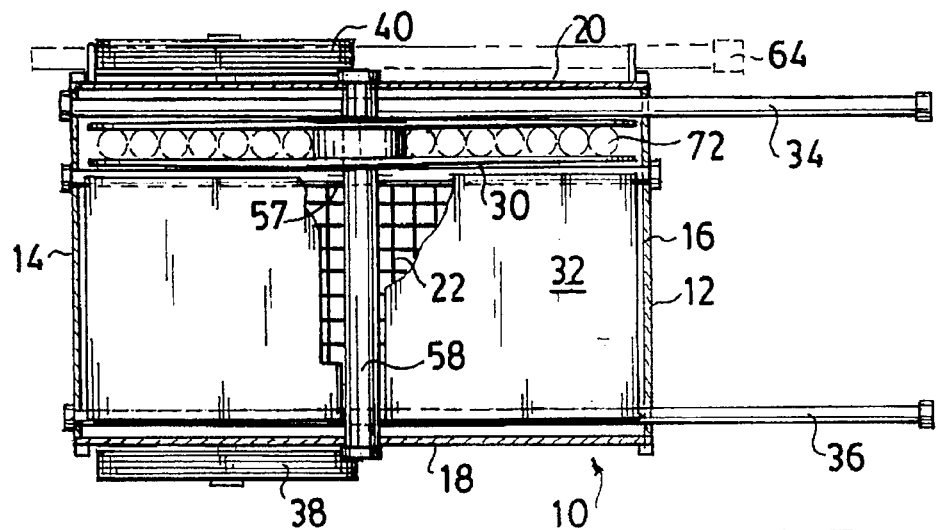
FIG. 3 is a cross-sectional view taken along line 3—3 of FIG. 2 of the pool equipment cart.

A pool equipment cart 10 in accordance with the present invention is illustrated in FIGS. 1–7. The pool equipment cart 10 includes a cabinet 12 with a pair of end panels 14 and 16, a pair of side panels 18 and 20, and a bottom panel 22. A roof 26 is slidably attached over an opening 28 between end panels 14 and 16 and side panels 18 and 20 which provides access to the cabinet interior. A take-up reel 30 and a shelf 32 are disposed inside the cabinet 12. Handles 34 and 36 can extend from one or both the end panels 14 and 16 and a pair of wheels 38 and 40 connected by an axle 42 are rotatably connected to the bottom panel 22. Two supporting pieces 44 and 46 are also connected to the bottom panel 22 to support cabinet 12 with the wheels 38 and 40. The pool equipment cart 10 provides a number of advantages, including a cart 10 which can easily transport to and from the swimming pool and can safely store all the pool equipment and chemicals, needed to clean and maintain a swimming pool.

Referring more specifically to FIGS. 1 and 2, back and side views of pool equipment cart 10 in accordance with the present invention are illustrated. The cart 10 is constructed from materials which can withstand rain, snow, and other elements and which are resistant to corrosion from pool chemicals, such as muriatic acid and concentrated baking soda. Preferably, the cabinet 12 is constructed from a lightweight material, such as plastic, so cart 10 is easy to maneuver and is durable in a variety of weather conditions.

Referring to FIG. 1, one of the end panels 14 of pool equipment cart 10 is shown. In this particular embodiment, end panel 14 has a substantially square-shape and end panel 16 (see also FIG. 2) has a substantially rectangular shape. Each end panel 14 and 16 has three openings 48, 50, and 52. Two openings 48 and 50 are adjacent side panels 18 and 20 and permit handles 34 .and 36 to extend through. The other opening 52 permits the end of a pipe 54, which braces take-up reel 30, to extend through and be secured to the exterior of end panel 14. End panel 16, shown also in FIGS.

2 and 6, is bent and extends up over the top of cart 10 and back down to form opening 28 with end panel 14 between side panels 18 and 20.

Referring to FIG. 2, one side panel 18 of the pool equipment cart 10 is illustrated. Side panels 18 and 20 are connected to opposing edges of end panels 14 and 16 and to bottom panel 22 to form a container. In this particular embodiment, the top of side panels 18 and 20 are curved having a substantially semi-circular shape. Each side panel 18 and 20 has a rail or ridge 56 along the top edge upon which curved roof 26 can engage and slide on to cover or expose opening 28. Take-up reel 30 has a sleeve 57 which rides on an axle 58. Axle 58 extends through the center of each side panel 18 and 20 and is secured by a screw and cap 60 or other mechanism on the exterior of each side panel 18 and 20. The exterior of one side panel 20 includes a bracket 62 for a telescoping pool rod 64 on the outside, as shown in FIGS. 1 and 3. The interior sides of side panels 18 and 20 may include a bracket 66 for items, such as the skimmer, leaf rake, and brush for the telescoping pool rod 64. Side panels 18 and 20 may have no brackets 62 and 66 or multiple brackets 62 and 66, if desired.

End panel 16 is curved to fit against a portion of the top edge of side panels 18 and 20 and extend over the top of the top of side panels 18 and 20. Slidable curved roof 26 with a lip 68 is seated on end panel 16 and side panels 18 and 20, with lips 68 secured under rail or ridge 56 on the top of each side panel 18 and 20. Curved roof 26 can be moved to expose or cover opening 28 between end panels 14 and 16 to protect the contents of cabinet 12 from elements. A space 27 (see FIG. 6) is provided between curved roof 26 and the top of end panel 16 near opening 28 to provide a ventilation hole for cabinet 12. The overlap of roof 26 and end panel 16 prevents elements from entering while providing a ventilation hole. End panels 14 and 16 and side panels 18 and 20 may also include other openings to access the cabinet interior, if desired. The opening 28 and any other opening could also be covered by a hinged door (not shown).

Figure 4:
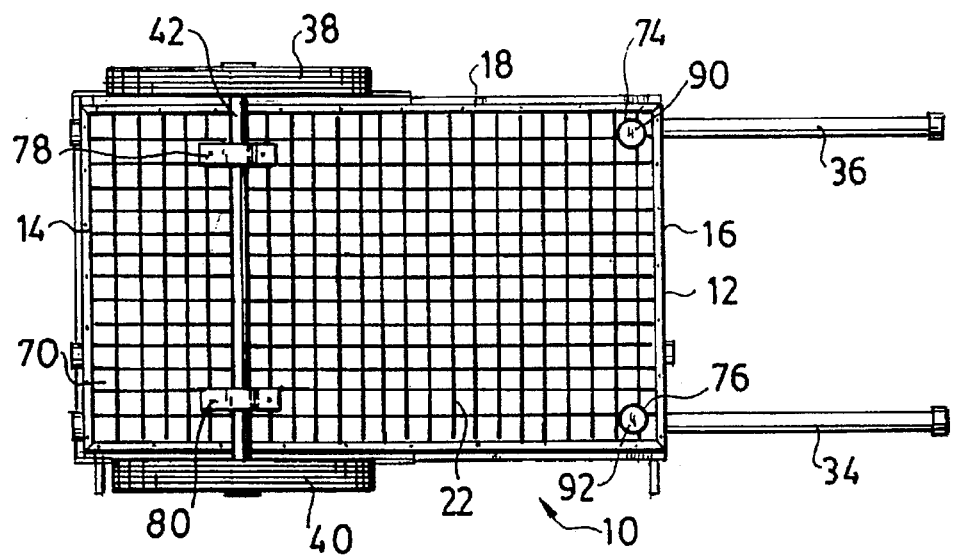
FIG. 4 is a bottom view of the pool equipment cart shown in FIG. 1.

Referring to FIG. 4, bottom panel 22 of the pool equipment cart 10 is illustrated. Bottom panel 22 is connected to a bottom edge of end panels 14 and 16 and side panels 18 and 20. Preferably, bottom panel 22 has a lattice structure with a plurality of holes 70 which allow any water in the pool vacuum hose 72 on the take-up reel 30 to drain out. Holes 70 also provide ventilation for any fumes from any of the pool chemicals in cabinet 12 so that fumes do not concentrate in cabinet 12 and pose a hazard. Bottom panel 22 may also be a solid panel or a solid panel having a drain hole, with or without a drain plug.

The cart 10 may also include the pair of wheels 38 and 40 connected by axle 42 which are disposed on opposite sides of side panels 18 and 20. A pair of brackets 78 and 80, which may include ball bearings, secures axle 42 to bottom panel 22. Wheels 38 and 40 and support pieces 44 and 46 support cabinet 12 off surface 88. Bottom panel 22 also includes holes 74 and 76 for support pieces 44 and 46 to pass through. The pool equipment cart 10 may also be constructed without wheels 38 and 40 and without support pieces 44 and 46. Bottom panel 22 would then rest on support surface 88.

Referring to FIG. 5, a cross-sectional view of the pool equipment cart 10 taken along lines 5—5 of FIG. 2 is shown. This view illustrates more clearly take-up reel 30, shelf 32, and bracket 66 inside cabinet 12 of pool equipment cart 10.

Take-up reel 30 includes sleeve 57 which is rotatably mounted on axle 58. Axle 58 extends between side panels 18 and 20 and the ends of axle 58 extend through and are secured to the exterior of side panels 18 and 20. Take-up reel 30 is also braced between one handle 34 and another pipe 54 which extends between and is secured to each end panel 14 and 16. Preferably, take-up reel 30 is designed only to accept a single width of pool vacuum hose 72, so that hose 72 will not tangle on take-up reel 30 when being wound-on or wound-off and to provide a neat and finished appearance. Take-up reel 30 could also be disposed on the outside of the cabinet 12, if desired. A take-up reel 30 which accepts more than a single width of pool vacuum hose could be used. In this particular embodiment, take-up reel 30 cart store up to 50 feet of pole vacuum hose 72. Preferably, take-up reel 30 is a flywheel which can be easily rotated once started to wind and unwind the pool vacuum hose 72. Although not shown, take-up reel 30 may also include a crankshaft, roller, or other system to rotate take-up reel 30 to wind or unwind pool vacuum hose 72.

Shelf 32 (also shown in FIG. 3) rests on pipe 54, and on handle 36 and is removable. Pool cleaning equipment and pool chemicals can be stored on and below the shelf 32 in the cabinet 12. Although only one shelf 32 is shown, the cabinet 12 could have more than one shelf 32 or no shelves, if desired.

Bracket 66 is also connected to the interior of side panel 18. Bracket 66 can be used to secure pool equipment, such as the skimmer, leaf-rake, and brush for telescoping pool rod 64 in cabinet 12. Although only one bracket 66 is shown, cabinet 12 could have more than one bracket 66 or no brackets, if desired.

Referring to FIG. 6, a cross-sectional view of the pool equipment cart 10 taken along line 6—6 of FIG. 1 is shown. Handles 34 and 36 are each secured to side panels 18 and 20 with handle screws 82 and 84, respectively, (shown in FIG. 5) which extend through cabinet 12. Handles 34 and 36 are substantially parallel to the supporting surface 88 for cabinet 12 and can be extended from one or both end panels 14 and 16 to create a pair of handles 34 and 36 from each end panel 14 and 16. Preferably, handles 34 and 36 are at waist height. With handles 34 and 36 extended from one end panel 16, cabinet 12 can be pushed like a wheelbarrow. Alternatively, with handles 34 and 36 extended from both end panels 14 and 16, cabinet 12 can be carried by two people to the desired location. The latter alternative would more likely be used with a cabinet 12 which does not have wheels 38 and 40 and does not have supporting pieces 44 and 46.

The pair of supporting pieces 44 and 46 extend through bottom panel 22 and up to handles 34 and 36. One end of each supporting piece 44 and 46 fits into the base of a T-connection 86. The top of T-connection 86 is seated over handle 36. Supporting pieces 44 and 46 support the side of the cabinet 12 not supported by wheels 38 and 40 so that bottom panel 22 is substantially parallel to the supporting surface 88 for cabinet 12. Rubber nubs 90 and 92 are connected to the other end of each of the supporting piece 44 and 46 to prevent cabinet 12 from scuffing on marring supporting surface 88.

Figure 7:
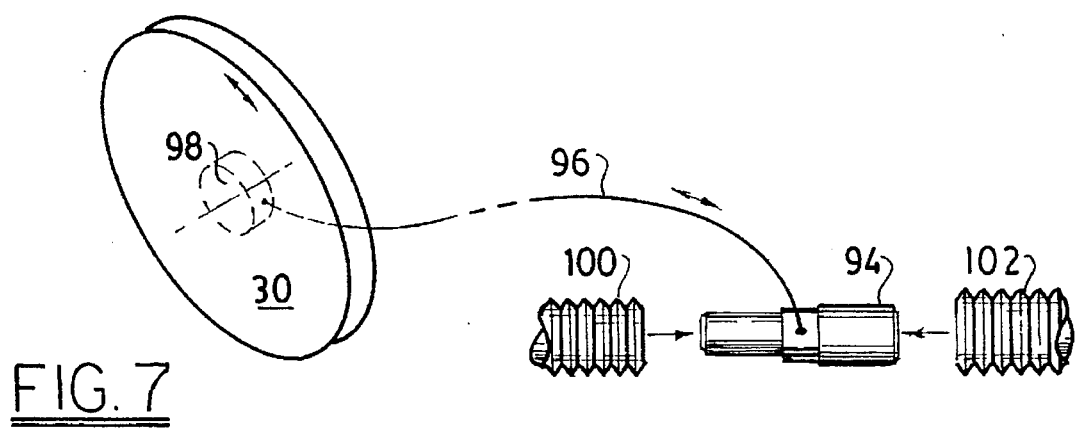
FIG. 7 is an exploded partial view of a pool vacuum hose starter for the take-up reel.

Referring to FIG. 7, an exploded partial view of a pool vacuum hose starter piece 94 for take-up reel 30. One end of a thin rope or string 96 is secured to the center 98 of take-up reel 30 and the other end is secured to starter piece 94. Starter piece 94 has opposing ribbed ends 100 and 102 of two different diameters. The diameters of the ends 100 and 102 are designed to accommodate the three common diameters for pool vacuum hoses 72, which are about 1¼", 1½", and 2", so that these ends 100 and 102 fit snugly within the end of a pool vacuum hose 72. When starter piece 94 has been inserted into one end of the pool vacuum hose 72, then take-up reel 30 is rotated to wrap the rope or string 96 around the center 90 of take-up reel 30 and then to pull the vacuum hose 72 into and around take-up reel 30.

The pool equipment cart 10 shown in FIGS. 1–7 provides a great convenience to pool owners in their cleaning and maintenance operations. The pool equipment cart 10 enables the pool cleaner to easily transport the necessary equipment and chemicals to the swimming pool and provides a convenient and neat storage container.

To move the cart 10, the pool owner can pull handles 34 and 36 out from one end panel 14 and 16 of cabinet 12, lift support pieces 44 and 46 off the ground, and push cabinet 12 along on wheels 38 and 40, like a wheelbarrow, to the desired location. Alternatively, the operator can extend handles 34 and 36 from both end panels 14 and 16 of cabinet 12 and with a partner can then grab both sets of handles 34 and 36 and carry cabinet 12 to the desired location. The lightweight construction of the pool equipment cart 10 makes it easy to maneuver and transport.

When the pool equipment cart 10 is at the desired location, curved roof 26 can be pushed back to expose opening 28, providing access to the cabinet interior. The operator can then withdraw the pool vacuum hose 72 from take-up reel 30 by simply pulling on one end of vacuum hose 72, can remove any chemicals necessary from shelf 32, and can remove telescoping pool rod 64 from bracket 62 on side panel 20 and any necessary accessories for telescoping pool rod 64 from bracket 66 in cabinet 12.

When the operator has completed his maintenance and cleaning, the pool chemicals and pool accessories and equipment can be stored in the cabinet 12 again. To put the pool vacuum hose 72 back on to take-up reel 30, the end of pool vacuum hose 72 is inserted over one of the ends 100 or 102 of starter piece 94 and take-up reel 30 is then rotated by hand or by other devices (not shown). Take-up reel 30 pulls rope or string 96 around the center 98 and then wraps pool vacuum hose 72 around take-up reel 30. If take-up reel 30 is a flywheel, then the weighted rims of the flywheel help to keep take-up reel 30 rotating and taking up hose 72. Preferably, take-up reel 30 is designed for a single width of pool vacuum hose 72 so that the hose 72 does not tangle during take-up or when being withdrawn. Bottom panel 22 conveniently provides holes 70 for water from vacuum hose 72 to drain out and also permits any fumes from the pool chemicals to escape.

Once the operator has put all of the equipment and the pool vacuum hose 72 back into cabinet 12, the operator can close the curved roof 26 over opening 28 in top panel 24. Since cabinet 12 is designed to protect its contents from the elements, the operator can simply leave cabinet 12 adjacent to the swimming pool. Alternatively, the operator could carry or wheel cabinet 12 back to a shed or garage for storage.

Having thus described the basic concept of the invention, it will be readily apparent to those skilled in the art that the foregoing detailed disclosure is intended to be presented by way of example only, and is not limiting. Various alterations, improvements, and modifications will occur and are intended to those skilled in the art, though not expressly stated herein. These modifications, alterations and improvements are intended to be suggested hereby, and are within the spirit and scope of the invention. Accordingly, the invention is limited only by the following claims and equivalents thereto.

What is claimed is:

1. A pool equipment cart comprising:
   a cabinet witch a pair of opposing end panels connected to a pair of opposing side panels and to a bottom panel to form a container, said container defining a cabinet interior;
   said cabinet having at least one opening which provides access to the cabinet interior; and
   said end, side, and bottom panels constructed from materials which are waterproof and resistant to corrosion from pool chemicals;
   said bottom panel having at least one hole to permit water and fumes to pass out of said cabinet;
   a pool vacuum hose take-up reel rotatably seated on a first axle in the cabinet interior, said first axle supported by said pair of side panels, said pool vacuum hose take-up reel spaced from one of said side panels by a first distance and from the other side panel by a second distance, wherein said second distance is at least twice the distance of said first distance to provide storage space in said cabinet; and
   a pair of rigid handles extending from at least one of said end panels and extending through said cabinet interior.

2. The cart according to claim 1 wherein said pool vacuum hose take-up reel has a pair of opposing rims each with a center and a cylindrical sleeve with opposing ends, said opposing ends of said cylindrical sleeve are each secured to one of the centers for said rims and said rims are separated by said sleeve a distance substantially equal to a single width of a pool vacuum hose.

3. The cart according to claim 1 wherein each of said rigid handles extend from both of said end panels.

4. The cart according to claim 1 further comprising at least one shelf supported by said pair of rigid handles in the cabinet interior and adjacent to said take up reel.

5. The cart according to claim 4 wherein said take-up reel is a flywheel.

6. The cart according to claim 1 further comprising:
   a rope with one end of said rope secured to a sleeve in said take-up reel which rotates on said first axle; and
   a cylindrical starter piece having a pair of ends, each of said starter piece ends designed to fit snugly within the end of a pool vacuum hose, said cylindrical starter piece secured to the other end of said rope.

7. The cart according to claim 6 wherein each of said ends of said starter piece is ribbed.

8. The cart according to claim 1 wherein said bottom panel has a lattice structure with a plurality of holes.

9. A pool equipment cart comprising:
   a cabinet with a pair of opposing end panels connected to a pair of opposing side panels and to a bottom panel to form a container, said container defining a cabinet interior;
   said cabinet having at least one opening which provides access to the cabinet interior; and
   said end, side, and bottom panels constructed from materials which are waterproof and resistant to corrosion from pool chemicals;
   said bottom panel having at least one hole to permit water and fumes to pass out of said cabinet;
   a pool vacuum hose take-up reel rotatably seated on a first axle in the cabinet interior, said first axle supported by said pair of side panels, said pool vacuum hose take-up reel spaced from one of said side panels by a first distance and from the other side panel by a second distance, wherein said second distance is at least twice the distance of said first distance to provide storage space in said cabinet; and a roof disposed on said side panels to move between positions exposing and covering the opening in said cabinet which provides access to the cabinet interior wherein one of said end panels has a top portion and wherein said roof overlaps part of said side panels and at least part of said top portion of said end panel and wherein a ventilation space is provided between said roof and said top portion.

10. The cart according to claim 9 further comprising:

a pair of wheels connected by a second axle, said second axle being rotatably secured to said bottom panel and said pair of wheels disposed on opposing sides of said pair of side panels; and at least one supporting piece extending from the bottom panel to support said cabinet with said pair of wheels.

11. The cart according to claim 10 further comprising at least one bracket secured to one of said side panels in the cabinet interior for securing pool equipment and accessories.

12. The cart according to claim 9 wherein each of said side panels has a ridge along a top edge and said roof has a pair of lips on opposing sides, wherein each of said lips is slidably wrapped around one of said ridges.

13. A pool equipment cart comprising:

a cabinet for storing and transporting pool equipment and chemicals, said cabinet having a pair of opposing end panels connected to a pair of opposing side panels and to a bottom panel to form a container, said container defining a cabinet interior;

said cabinet having at least one opening which provides access to the cabinet interior;

a pool vacuum hose take-up reel rotatably seated on a first axle, said first axle supported by said pair of side panels and said take-up reel having a pair of opposing rims each with a center and a cylindrical sleeve with opposing ends, said opposing ends of said cylindrical sleeve are each secured to one of the centers for said rims and said rims are separated by said sleeve a distance substantially equal to a single width of a vacuum hose; and a rope with one end of said rope secured to a sleeve in said take-up reel which rotates on said first axle; and a cylindrical starter piece having a pair of ends, each of said ends is designed to fit snugly within the end of a pool vacuum hose, said cylindrical starter piece secured to the other end of said rope.

14. The cart according to claim 13 wherein each of said ends of said starter piece is ribbed.

15. A pool equipment cart comprising:

a cabinet for storing and transporting pool equipment and chemicals, said cabinet having a pair of opposing end panels connected to a pair of opposing side panels and to a bottom panel to form a container, said container defining a cabinet interior;

said cabinet having at least one opening which provides access to the cabinet interior;

a pool vacuum hose take-up reel rotatably seated on a first axle mounted between said pair of side panels;

a rope with one end of said rope secured to the center of said take-up reel; and a starter piece having a pair of ends, each of said starter piece ends designed to fit snugly within the end of a pool vacuum hose, said starter piece secured to the other end of said rope.

16. The cart according to claim 15 wherein:

said end, side, and bottom panels are constructed from materials which are waterproof and resistant to corrosion from pool chemicals; and said bottom panel having at least one hole to permit water and fumes to pass out of said cabinet.

17. The cart according to claim 16 wherein each of said ends of said starter piece is ribbed.

* * * * *